United States Patent [19]

Matsuzaki

[11] Patent Number: 5,474,800
[45] Date of Patent: Dec. 12, 1995

[54] METHOD FOR PREPARING ANODE FOR SOLID OXIDE FUEL CELLS

[75] Inventor: Yoshio Matsuzaki, Tokyo, Japan

[73] Assignee: Tokyo Gas Company, Ltd., Minato, Japan

[21] Appl. No.: 136,213

[22] Filed: Oct. 12, 1993

Related U.S. Application Data

[63] Continuation-in-part of Ser. No. 900,231, Jun. 17, 1992, abandoned.

[30] Foreign Application Priority Data

Jun. 20, 1991 [JP] Japan ................................ 3-176235
Nov. 1, 1991 [JP] Japan ................................ 3-313543

[51] Int. Cl.$^6$ ............................................. B05D 5/12
[52] U.S. Cl. ...................... 427/115; 427/126.3; 427/229; 427/376.1; 427/385.5
[58] Field of Search .............................. 427/115, 126.3, 427/229, 376.1, 385.5

[56] References Cited

U.S. PATENT DOCUMENTS

| | | | |
|---|---|---|---|
| 4,597,170 | 7/1986 | Isenberg | 29/623.5 |
| 4,849,254 | 7/1989 | Spengler et al. | 427/115 |
| 5,021,304 | 6/1991 | Ruka et al. | 429/30 |
| 5,227,258 | 7/1993 | Ito et al. | 429/40 |

FOREIGN PATENT DOCUMENTS

0478185A2  9/1991  European Pat. Off. ......... H01M 8/12
3942384   6/1990  Germany.

OTHER PUBLICATIONS

English Abstract of Japanese unexamined patent publication No. 64–3070 Database WPI, Section Ch, Week 8223, Derwent Publications Ltd., London GB; Class L03, AN 82–47136E & JP-A-57 071 115 (TDK Electronics KK) 1 May 1982.

*Primary Examiner*—Benjamin L. Utech
*Attorney, Agent, or Firm*—Quarles & Brady

[57] ABSTRACT

A method of manufacturing an anode for solid oxide fuel cells is disclosed whereby the dispersion of nickel particles which form the anode for the solid oxide fuel cell is ensured, coherence of the Ni or NiO particles when being annealed or when generating electricity is prevented, the adhesion of the anode to the solid electrolyte layer is good, the contact resistance is reduced, and the electrode performance is improved.

To form an anode on one surface of the central solid electrolyte layer, first, Ni or NiO, and a solution of an organometallic complex salt in an organic solvent, from which is obtained thin-films or minute particles of a solid electrolyte by thermal decomposition, are blended, and the solvent is evaporated until a suitable viscosity is obtained. The slurry obtained in this manner is coated onto the central solid electrolyte layer and this coated film is then dried, annealed, and thermally decomposed to obtain an NiO-solid-electrolyte or an Ni-solid-electrolyte cermet.

3 Claims, 4 Drawing Sheets

METHOD FOR PREPARING ANODE FOR SOLID OXIDE FUEL CELLS

This is a continuation-in-part of prior application Ser. No. 07/900,231 filed on Jun. 17, 1992 now abandoned.

BACKGROUND OF THE INVENTION

1. Field of the Invention

The present invention relates to a method of manufacturing an anode for a solid oxide fuel cell.

2. Description of the Prior Art

Recently, considerable attention has been focused on the fuel cell as an energy source, not only from the viewpoint of conservation of resources, but also that of the effect on the environment. The solid electrolyte type of fuel cell in principle has a high electric generating efficiency because of the high operating temperatures of 800° to 1000° C. in the fuel cell, and because the materials of construction are all solid it has the advantage of ease in handling, so that progress is being made in the practical application of this device. FIG. 1 shows a rough outline of the structure of a solid electrolyte fuel cell wherein the center is a solid electrolyte 1, on one surface of which a fuel electrode 2 (hereinafter referred to as "anode"), and on the other surface an air electrode 3 (hereinafter referred to as "cathode") are formed. The anode 2 and the cathode 3 form a pair of interfaces 4 and 5 respectively with the solid electrolyte, and are connected by an external circuit through a load 6. When a fuel gas such as hydrogen ($H_2$), methane ($CH_4$), or the like is supplied to the anode 2, and an oxidizing agent such as air, oxygen ($O_2$), or the like is supplied to the cathode 3, an electromotive force is produced between the anode 2 and the cathode 3, and a current flows through the load 6 connected to the external circuit. The following types of reactions occur at the interfaces 4 and 5 of the anode 2 and the cathode 3 respectively.

Interface 4: $O^{2-} + H_2 \rightarrow H_2O = 2e-$
Interface 5: $O_2 + 2e- \rightarrow O^{2-}$ In this type of solid oxide fuel cell it is known that the microstructure of the electrodes has a major influence on the cell performance. The effect of the microstructure of the anode 2 is particularly great. Normally a cermet is used for the anode 2, and the technology for obtaining the optimum microstructure is extremely important.

A method for preparing the anode 2 is commonly known wherein generally an Ni-YSZ (yttria stabilized zirconia) cermet or the like, Ni particles or NiO particles, and YSZ particles are mechanically blended, coated onto an electrolyte layer, and annealed. Problems occur with this technology because the Ni particles or NiO particles and YSZ particles are mechanically blended so that the dispersion of the Ni particles or NiO particles is poor. When the electrode is annealed or when generating electricity the Ni particles tend to cohere, with the result that the performance of the anode, drops, and the adhesion of the anode to the electrolyte layer is poor. In addition, there is a tendency toward a large contact resistance and peeling of the electrode, so that the life span is shortened.

SUMMARY OF THE INVENTION

An object of the present invention is to provide, with due consideration to the drawbacks of such conventional electrodes, a method of preparing an anode for solid oxide fuel cells whereby the dispersion of nickel particles which form the anode for the solid oxide fuel cells is ensured, coherence of the Ni (or NiO) particles when being annealed or when generating electricity is prevented, the adhesion of the anode to the solid electrolyte layer is good, the contact resistance is reduced, and the electrode performance is improved.

This object is achieved in the present invention by the provision of a thermal decomposition method for an organometallic compound, which is an oxide film-forming process. Specifically, in order to form a fuel electrode on one surface of the central solid electrolyte layer, first a metal such as Ni or the like or a metallic oxide powder such as NiO or the like is blended with a solution of an organometallic compound from which is obtained a film or minute particles of a solid electrolyte by thermal decomposition. The solvent is then evaporated off until a suitable viscosity is obtained. The slurry obtained by this process is coated onto the solid electrolyte layer and this coated film is then dried, annealed, and thermally decomposed to obtain a metal-solid electrolyte complex cermet. Further, the solid electrolyte layer and the solid electrolyte grains in the electrode do not necessarily have to be made of the same elements. Also, the solid electrolyte powder may be added to the slurry.

A finely controlled microstructure in which the metal, such as Ni, or the metal oxide, such as NiO, are surrounded by thin films or fine precipitates of electrolyte causes the metal or metallic oxide particles to not cohere but be uniformly dispersed, and strengthens adhesion of the anode to the electrolyte. In addition, because of applying the thin-film forming process, which is a thermal decomposition of a metallic soap, to a fabrication of YSZ composition adjacent to the anode-electrolyte interface, the central solid electrolyte layer and the electrolyte grains in the anode are very strongly combined. For this reason, a microstructure is provided in which the electrolyte in the anode is grown from the surface of the central electrolyte, and the surface area of the electrolyte layer is substantially increased. By adding the solid electrolyte powder to the slurry, control of the diameter of the solid electrolyte particles is simplified, and control of the microstructures is more precise.

BRIEF DESCRIPTION OF THE DRAWINGS

These and other objects, features, and advantages of the present invention will become more apparent from the following description of the preferred embodiments taken in conjunction with the accompanying drawings, in which.

DETAILED DESCRIPTION OF THE PREFERRED EMBODIMENTS

The present invention will now be explained based on the following embodiments of the present invention.

In the present invention it is possible to use a solid solution possessing oxygen ion conductivity in which several percent to several tens percent of a divalent or trivalent metal oxide, such as yttrium oxide ($Y_2O_3$), calcium oxide (CaO) or the like is doped to a tetravalent metal oxide such as zirconium oxide ($ZrO_2$), as a solid electrolyte.

A fatty acid salt having at least six carbon atoms, such as a naphthenic acid salt, an octyl acid salt, or the like, and acetyl acetonate can be used as an organometallic compound. A solvent which can uniformly dissolve the metal compound, such as toluene or acetyl acetone, or a mixture of these solvents, is used as an organic solvent.

The volume of Ni in the prepared cermet with respect to the total cermet body is in the 0.4 to 0.98 range.

Commonly known methods such as slurry coating, screen printing, and the like can be used in coating the blended slurry onto the central solid electrolyte layer.

Some examples of an anode of the present invention using the above-mentioned material will now be explained.

EXAMPLE 1

An NiO powder with an average particle diameter of 7 μm was blended with a toluene, acetyl acetone solution of zirconium octylate (($RCO_2)_4Zr$, where $R=C_7H_{15}$) and yttrium octylate (($RCO_2)_3Y$, where $R=C_7H_{15}$) (for which the composition corresponds to the stoichiometry of 8 mol% $Y_2O_3$– 92 mol% $ZrO_2$ after thermal decomposition) to give, after thermal decomposition, a ratio of NiO:YSZ of 0.947:0.053 by weight. After the solvent was evaporated off to a suitable viscosity, the resulting solution was screen-printed onto a central solid electrolyte (YSZ) plate. This material was then dried at 100° to 200° C., thermally decomposed at 300° to 500° C., and annealed at 1450° C.

Figure 1:
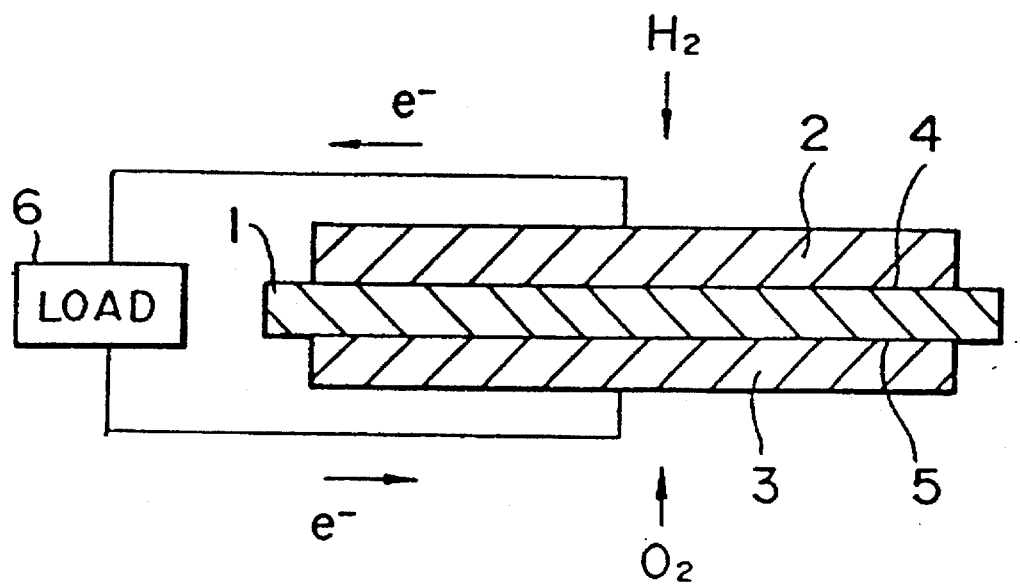
FIG. 1 shows a configuration of a single cell of a fuel cell of solid electrolyte.
Figure 2:
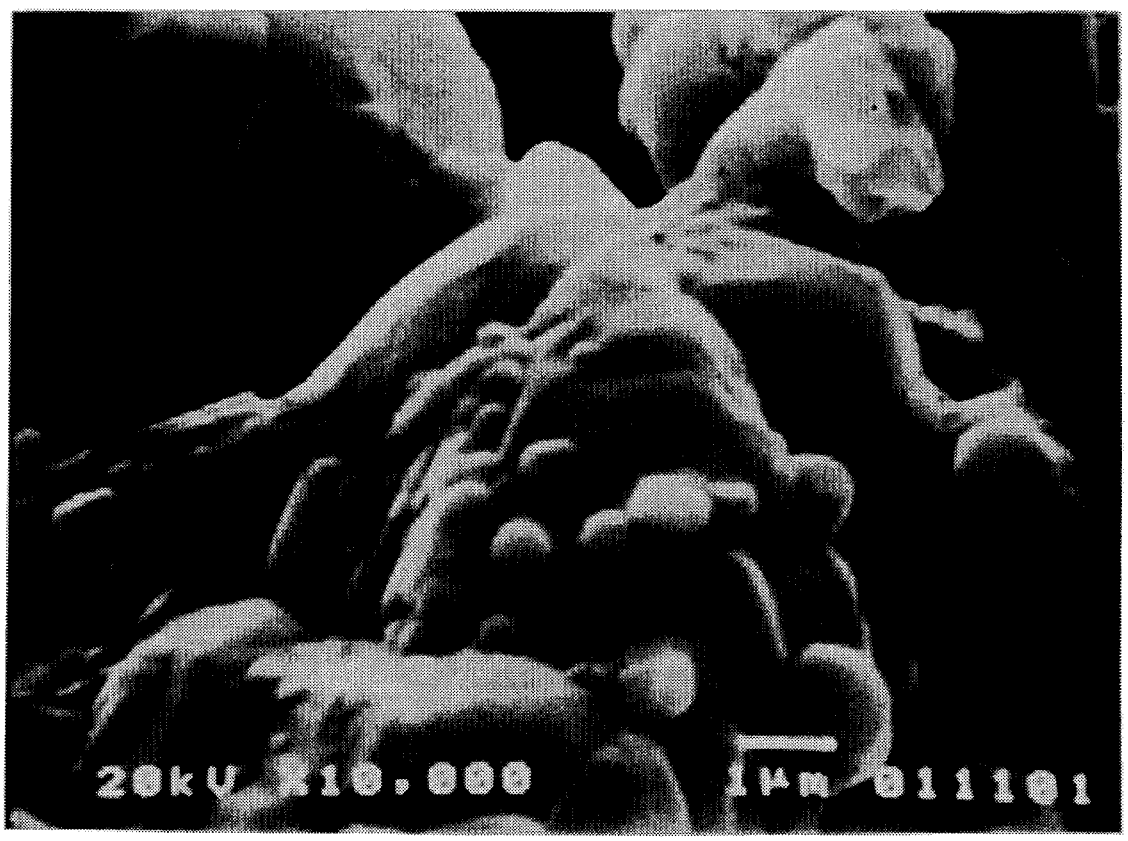
FIG. 2 is a microscopic-photograph showing the microstructure of an anode prepared by a first embodiment of the present invention.

As a result, a microstructure shown in the photograph of FIG. 2, in which YSZ particles of an average diameter of 1 μm or less were uniformly deposited on the surface of NiO grains and electrolyte (YSZ), was obtained. The performance of the anode was good and a reduction in polarization was observed. The power density of the single cell was also improved.

EXAMPLE 2

Figure 3:
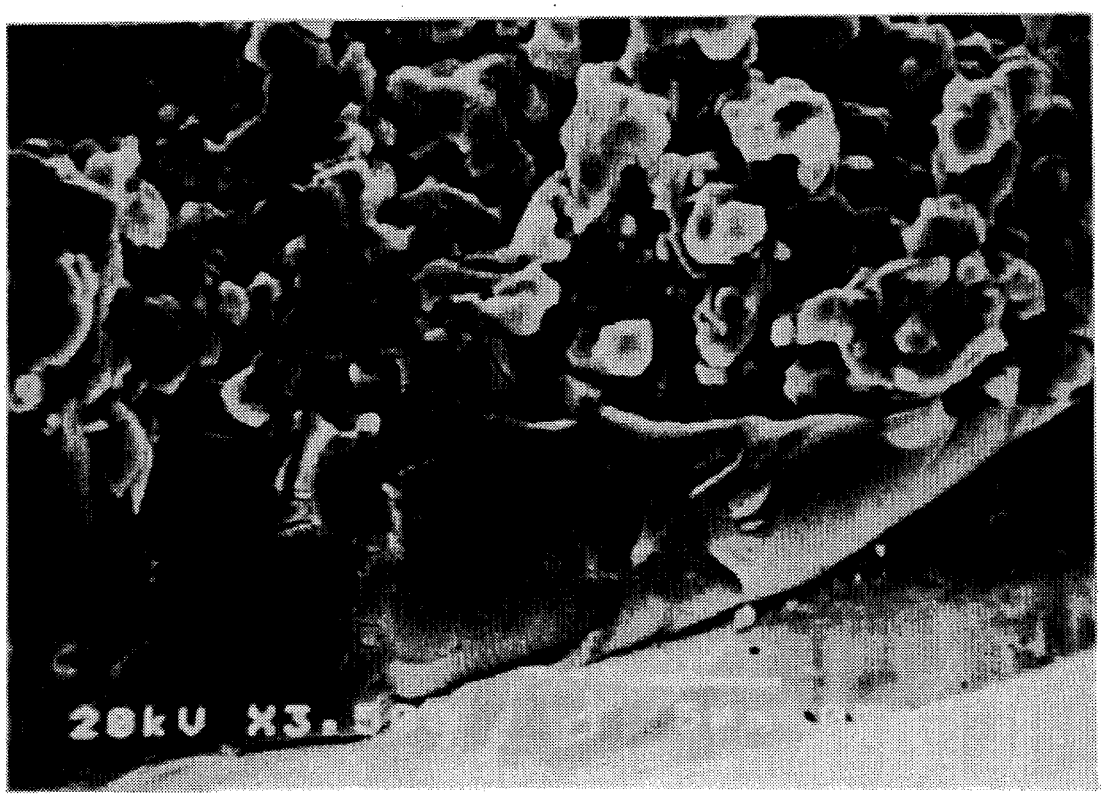
FIG. 3 is a microscopic photograph showing the structure adjacent to the interface of an anode and the central solid electrolyte in a second embodiment of the present invention.

An NiO powder with an average particle diameter of 0.9 μm was blended with the toluene, acetyl acetone solution of zirconium octylate and yttrium octylate used in Example 1, then processed in the same manner as in Example 1. As a result, as shown in the photograph of FIG. 3, an anode microstructure in which the circumference of each NiO grain was covered with a YSZ film was obtained. It can be readily understood from the photograph that the bond at the interface between this anode and the solid electrode (YSZ) plate is extremely secure. Therefore, both the contact resistance and the polarization of the formed anode are small, and a wide improvement was observed in the power density of the single cells.

EXAMPLE 3

An NiO powder with an average particle diameter of 0.9 μm was blended with a toluene, acetyl acetone solution of cerium (Ce) octylate and yttrium octylate (adjusted so that after thermal decomposition a composition of $CeO_2$ doped with 10 mol% of $Y_2O_3$ was obtained) to give, after thermal decomposition, a ratio of NiO:(CeO doped with $Y_2O_3$) of 0.947:0.053 by weight. After the solvent was evaporated off to a suitable viscosity, the resulting solution was screen-printed onto a central solid electrolyte (YSZ) plate. This material was then thermally decomposed and annealed at the same temperature profiles as in Examples 1 and 2.

Even when the electrolyte in the electrode is changed from $ZrO_2$ doped with $Y_2O_3$ (Examples 1 and 2) to $CeO_2$ doped with $Y_2O_3$ (Example 3), it can be understood that when this method is used an extremely good electrode is obtained. The electrode shows the same degree of performance with respect to contact resistance and polarization as in Example 2.

Figure 4:
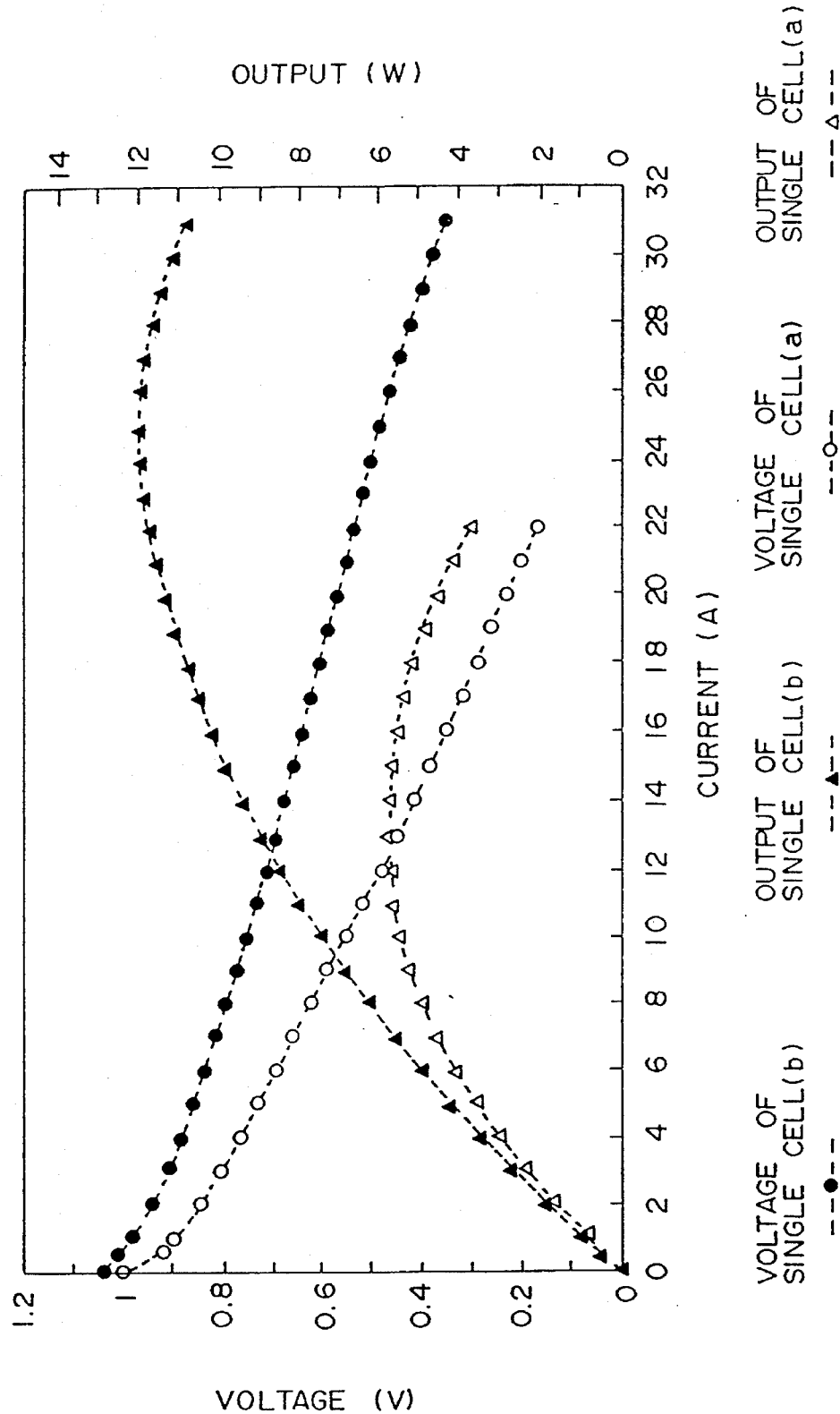
FIG. 4 is a graph showing a comparison of the electrical output characteristics of a single cell fuel cell using the anode prepared by the method of the present invention and a single cell using an anode prepared by a conventional method.

$ZrO_2$ doped with 3 mol% $Y_2O_3$ is used as the central solid electrolyte; $LaSrMnO_3$ (lanthanum manganite doped with strontium) is used as the cathode material, and the cermet obtained from this invention (Example 2) is used as the fuel electrode. Cell performance was tested for a single cell (a) for which the anode was prepared by the conventional method of simply blending the materials, and for a single cell (b) for which the anode was prepared by the method of Example 2, under the following conditions. The results of a comparison of output voltages and output power are given in FIG. 4.
(1) Flows on fuel electrode side
  Hydrogen flow: 1000 SCCM
  Nitrogen flow: 500 SCCM
(2) Air electrode flow
  Airflow: 2000 SCCM
(3) Temperature 1000° C.
(4) Effective electrode area: 21 $cm^2$ In comparing the two cells it is seen that the cell prepared by the method of the present invention is far superior in both voltage and power to the conventionally manufactured cell.

In the present invention, materials other than those described above which can be used as the organometallic compound include metallic fatty acid salts such as octyl acid salt, naphthenic acid salt, neodecanoic acid salt, ethylhexanoic acid salt, propionic acid salt, stearic acid salt, and the like, and acetylacetonate complexes. In addition, in place of Ni or NiO particles, at least one type of metallic particle such as Co, Fe and their alloys can be used.
(1) Reduction of contact resistance between electrode and electrolyte:

As a result of the present invention, an anode is obtained of a structure in which a thin- film or minute particles of an electrolyte are uniformly deposited on the surface of Ni or NiO grains and on the surface of a central solid electrolyte so that the Ni or NiO grains do not cohere but are uniformly dispersed. In addition, because the thermal decomposition of a metallic soap, which is a film-forming process, is applied to the YSZ composition, the bond between the central solid electrolyte and the electrolyte in the anode is extremely strong at a position adjacent to the interface, and is integrally formed. For this reason, the structure is such that the electrolyte in the anode grows from the surface of the central solid electrolyte and the surface area of the electrolyte layer is substantially increased. As a result, a microstructure is obtained in which the point of contact between the Ni particles and the electrolyte layer is large so that the electrode has a small contact resistance.
(2) Reduction of polarization:

As described in (1), the central electrolyte and the Ni or NiO are uniformly dispersed and the electrolyte particles and electrolyte layer in the cermet are strongly bonded at the interface. Therefore the surface area of the electrolyte layer in the microstructure is increased. Specifically, an ideal electrode microstructure is obtained in which the length of the three-layer interface between the Ni adjacent to the interface and the electrolyte and the gaseous phase is very great, so that polarization from the anode is extremely small.

(3) Increase in adhesion strength between the central solid electrolyte layer and the electrolyte layer of the anode:

As described in (1), because the central solid electrolyte layer and the electrolyte layer of the anode are strongly bonded with each other, the adhesion strength between the central solid electrolyte layer and the electrolyte layer of the anode is very great, and the Ni particles are uniformly distributed. The electrolyte thin-films or the minute particles cover the circumference of the Ni grains so that there is no cohesion between like particles of Ni, and there is little tendency for the electrode to peel. As a result, the electrode has a long life expectancy.

TEST EXAMPLE

In order to provide the excellent adhesion strength between the central solid electrolyte layer and the electrolyte layer of the anode of the present invention, an adhesion-strength test as regulated by JIS (Japanese Industrial Standard) and explained below is applied on the anode obtained in the above-described Example 2 and on a prior art anode. The prior art test price is a powdery cermet of NiO/YSZ having the NiO:YSZ=0.947:0.053 (by weight) YSZ:8 mol% $Y_2O_3$–92 mol% $ZrO_2$ compositions.

The test is called "Manual Scratching Method" in which a test piece is scratched, in turn, by various lead pencils having different hardness from 6B to 9H till a scratch and a peeling-off is caused thereby on the surface layer of the test piece.

Test results obtained by applying the test on the anode of the present invention and on the prior art anode are compared with each other as shown in the following Table.

TABLE 1

|  | 6B | 5B | 4B | 3B | 2B | B | HB | F | H |
|---|---|---|---|---|---|---|---|---|---|
| TEST PIECE 1 | O | O | O | O | O | O | Δ | Δ | Δ |
| TEST PIECE 2 | O | O | O | O | O | O | O | O | O |

|  | 2H | 3H | 4H | 5H | 6H | 7H | 8H | 9H |
|---|---|---|---|---|---|---|---|---|
| TEST PIECE 1 | Δ | Δ | X | X | X | X | X | X |
| TEST PIECE 2 | O | O | O | O | O | O | O | O |

(Remarks)

(1) TEST PIECE 1: Prior art anode
(2) TEST PIECE 2: Anode obtained in Example 2
(3) Test result o represents "no change"
(4) Test result Δ represents "scratch is caused"
(5) Test result X represents "peeling-off is caused"

As is clearly understood from the above Table 1, there was not any peeling-off, nor even any scratch, on the surfaces of the anode of the present invention, thereby proving the superior adhesion-strength of the anode of the present invention.

What is claimed is:

1. A method of preparing an anode for a fuel cell having a central solid electrolyte layer, comprising the steps of:

coating a blended slurry of an organometallic compound of an organic acid salt having at least six carbon atoms, the organometallic compound being selected from the group consisting of an octyl acid salt, a naphthenic acid salt, and an acetylacetonate complex, and mixtures thereof, and a powder of metal or a powder of a metal oxide onto the surface of said central solid electrolyte layer of said fuel cell;

drying and thermally decomposing said slurry; and annealing a thus prepared anode so that electrolyte films or particles are uniformly distributed on the surface of grains of said metal or metal oxide and on the surface of said central solid electrolyte layer.

2. The manufacturing method according to claim 1, wherein solid electrolyte powder is added to said blended slurry.

3. A method of preparing an anode for a fuel cell having a central solid electrolyte layer, comprising the steps of:

coating a blended slurry of an organometallic compound comprising a compound selected from the group consisting of an octyl acid salt, a naphthenic acid salt, a neodecanoic acid salt, an ethylhexanoic acid salt, stearic acid, an acetylacetonate complex, and mixtures thereof, and a powder of metal or a powder of metal oxide, onto the surface of said central solid electrolyte layer of said fuel cell;

drying and thermally decomposing said slurry; and annealing a thus prepared anode so that electrolyte films or particles are uniformly distributed on the surface of grains of said metal or metal oxide and on the surface of said central solid electrolyte layer.

\* \* \* \* \*